(12) United States Patent
Ahn et al.

(10) Patent No.: US 7,302,762 B1
(45) Date of Patent: Dec. 4, 2007

(54) PLATE TYPE CAPACITIVE SENSOR FOR FIVE-DIMENSIONAL DISPLACEMENT MEASUREMENT

(75) Inventors: Hyeong-Joon Ahn, Seoul (KR); Chi-Hyoung Shim, Seoul (KR); Dong-Chul Han, Seoul (KR)

(73) Assignee: Seoul National University Industry Foundation (KR)

( * ) Notice: Subject to any disclaimer, the term of this patent is extended or adjusted under 35 U.S.C. 154(b) by 12 days.

(21) Appl. No.: 11/432,145

(22) Filed: May 11, 2006

(51) Int. Cl.
G01B 7/14 (2006.01)
G01R 27/26 (2006.01)

(52) U.S. Cl. .......................... 33/300; 33/700; 324/688
(58) Field of Classification Search ................. 33/300, 33/351, 613, 645, 700, 706; 324/658, 662, 324/686, 688
See application file for complete search history.

(56) References Cited

U.S. PATENT DOCUMENTS

| | | | | |
|---|---|---|---|---|
| 3,678,378 A | * | 7/1972 | Trott et al. | 324/686 |
| 6,842,015 B2 | * | 1/2005 | Morimoto | 324/662 |
| 7,119,554 B2 | * | 10/2006 | Nakamura et al. | 324/688 |
| 2004/0189327 A1 | * | 9/2004 | Al-Rawi | 324/658 |
| 2006/0176063 A1 | * | 8/2006 | Ahn et al. | 324/688 |

* cited by examiner

Primary Examiner—G. Bradley Bennett
(74) Attorney, Agent, or Firm—Cantor Colburn LLP

(57) ABSTRACT

Disclosed herein is a plate type capacitive sensor for five-dimensional displacement measurement that is capable of simultaneously measuring five-dimensional movement of an object, which includes the horizontal movement, the vertical movement, and the tilt of the object. The plate type capacitive sensor for five-dimensional displacement measurement comprises a plate located adjacent to an object to be measured, and a ground part, a first guard part, a displacement measuring sensor, and a second guard part, which are stacked on the plate in consecutive order. The plate may be made by machining or made of a printed circuit board (PCB).

7 Claims, 11 Drawing Sheets

PLATE TYPE CAPACITIVE SENSOR FOR FIVE-DIMENSIONAL DISPLACEMENT MEASUREMENT

BACKGROUND OF THE INVENTION

1. Field of the Invention

The present invention relates to a capacitive sensor, and, more particularly, to a plate type capacitive sensor for five-dimensional displacement measurement that is capable of simultaneously measuring five-dimensional movement of an object, which includes the horizontal movement, the vertical movement, and the tilt of the object.

2. Description of the Related Art

Smart sensor systems, in particular, position measurement systems are expected to play a significant role in the high precision intelligent manufacturing system. For examples, a feedback control is inevitable to ensure the sufficient repeatability for the high resolution positioning of semiconductor manufacturing systems. In addition, usage of active bearings like active magnetic bearings are being increased to achieve the higher precision and productivity. In these systems, the position measurement systems not only affect the system performance but also the system size and complexity.

Capacitive sensors are widely used in short-range ultra-precision and control applications because they have higher resolutions compared with other types of sensors. The greater the ratio of the area of sensor to the distance from the target, the greater the accuracy and resolution of the sensor. In addition, the ratio of sensor area to the characteristic surface finish dimension of the part should be as great as possible to provide the averaging effect.

A plate type capacitive sensor has been developed for use as a measuring device for two-dimensional micro-position control. However, error analysis and design criteria, such as change in distance between the sensor and the object, has not been sufficiently studied, and therefore, this plate type capacitive sensor is hardly used in ultra-precision applications. Cylinder type capacitive sensor was developed and applied to several applications as the CCS is less sensitive to geometric errors and has high resolution with large sensing area. However, the measurement range of the cylinder type capacitive sensor is narrow due to its large nonlinearity and the manufacturing procedure of the cylinder type capacitive sensor is very complicated. Consequently, the cylinder type capacitive sensor is not widely utilized.

SUMMARY OF THE INVENTION

Therefore, the present invention has been made in view of the above problems, and it is an object of the present invention to provide a capacitive sensor for five-dimensional displacement measurement that is capable of simultaneously five-dimensional movement of an object, which includes the horizontal movement, the vertical movement, and the tilt of the object, and eliminating errors generated during measurement while measuring a large area, thereby accomplishing precise measurement.

It is another object of the present invention to provide an improved capacitive sensor for five-dimensional displacement measurement that can be manufactured with a printed circuit board (PCB) such that the capacitive sensor can be used in a small space, whereby the manufacturing costs of the capacitive sensor is considerably reduced.

In accordance with the present invention, the above and other objects can be accomplished by the provision of a plate type capacitive sensor for five-dimensional displacement measurement, comprising: a plate located adjacent to an object to be measured; and a ground part, a first guard part, a displacement measuring sensor, and a second guard part, which are stacked on the plate in consecutive order.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
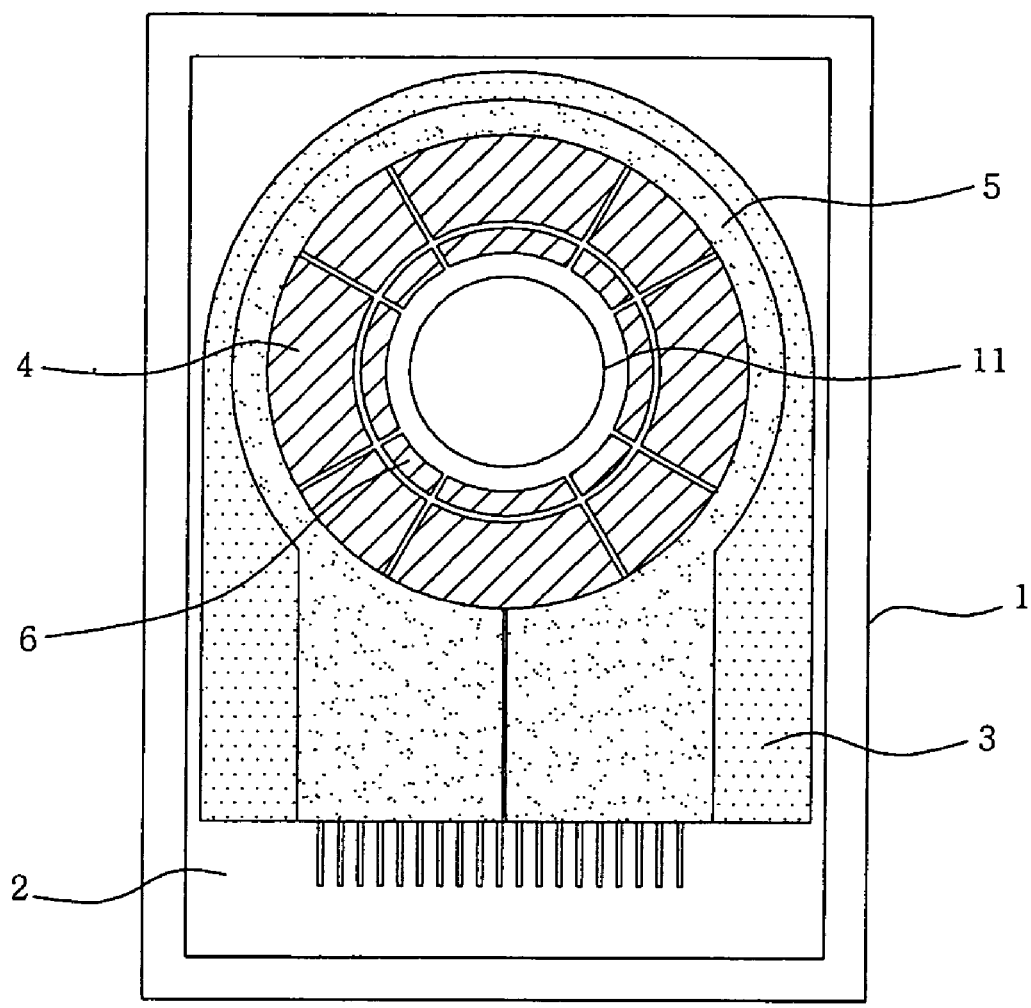
FIG. 1 is a front view illustrating a plate type capacitive sensor for five-dimensional displacement measurement according to the present invention.

FIG. 1 illustrates the structure of a plate type capacitive sensor for five-dimensional displacement measurement according to the present invention.

As shown in FIG. 1, the plate type capacitive sensor for five-dimensional displacement measurement according to the present invention comprises: a plate 1 having a hole 11, through which an object to be measured is inserted or through which it is confirmed that the object to be measured is concentrically disposed; and a ground part 2, a first guard part 3, a displacement measuring sensor 4, and a second guard part 5, which are stacked on the plate 1 in consecutive order. The plate 1 may be a printed circuit board (PCB).

The displacement measuring sensor 4 is constructed as follows: eight electrode sections, which constitute the displacement measuring sensor 4, are disposed in the shape of a ring on the same plane while a predetermined gap is provided between the respective electrode sections, in a similar fashion to the conventional cylinder type capacitive sensor. The eight electrode sections include four 60-degree electrode sections and four 30-degree electrode sections, which are alternately arranged such that combined operations of the respective electrode sections are possible. If necessary, the angles of the electrode sections may be changed such that the electrode sections have other different angles.

The capacitance between the displacement measuring sensor 4 and the object is changed depending upon the change in area common to the displacement measuring sensor 4 and the object and the change in distance between the displacement measuring sensor 4 and the object. As a result, when the object is moved in the radial direction, the area common to the displacement measuring sensor 4 and the object is changed, and therefore, a quantity of electric charge is changed. Consequently, the plate type capacitive sensor for five-dimensional displacement measurement according to the present invention is capable of measuring the horizontal displacement of the object. Also, when the object is moved in the axial direction, the distance between the displacement measuring sensor 4 and the object is changed, and therefore, a quantity of electric charge is changed. Consequently, the plate type capacitive sensor for five-dimensional displacement measurement according to the present invention is capable of measuring the vertical displacement of the object.

The plate type capacitive sensor for five-dimensional displacement measurement according to the present invention further comprises: a tilt measuring sensor 6 disposed inside the displacement measuring sensor 4 for detecting initial tilt of the displacement measuring sensor 4 to the object. The plate type capacitive sensor for five-dimensional displacement measurement according to the present invention corrects measurement errors of the displacement measuring sensor 4 due to the initial tilt of the displacement measuring sensor 4 to the object, which is detected by the tilt measuring sensor 6, to compensate for the initial tilt, which causes errors in the horizontal and vertical displacement measurement.

Now, the structure and operation of the components of the plate type capacitive sensor for five-dimensional displacement measurement shown in FIG. 1 will be described in detail.

Figure 2:
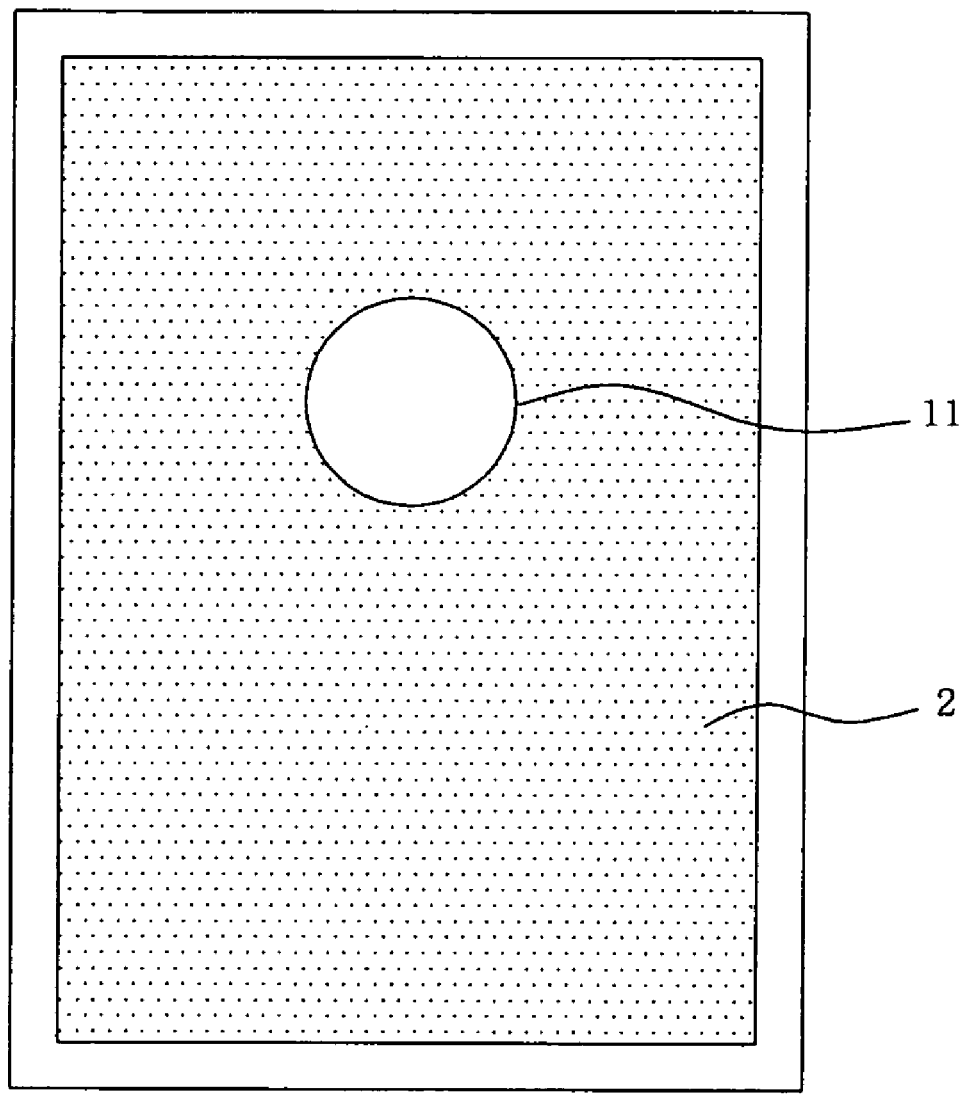
FIG. 2 is a front view of a ground part shown in FIG. 1.

The ground part 2 is illustrated in FIG. 2. The ground part 2 serves to protect measured signals from external electric fields. The ground part 2 is connected to the ground terminal of a sensor signal amplifier (not shown).

Figure 3:
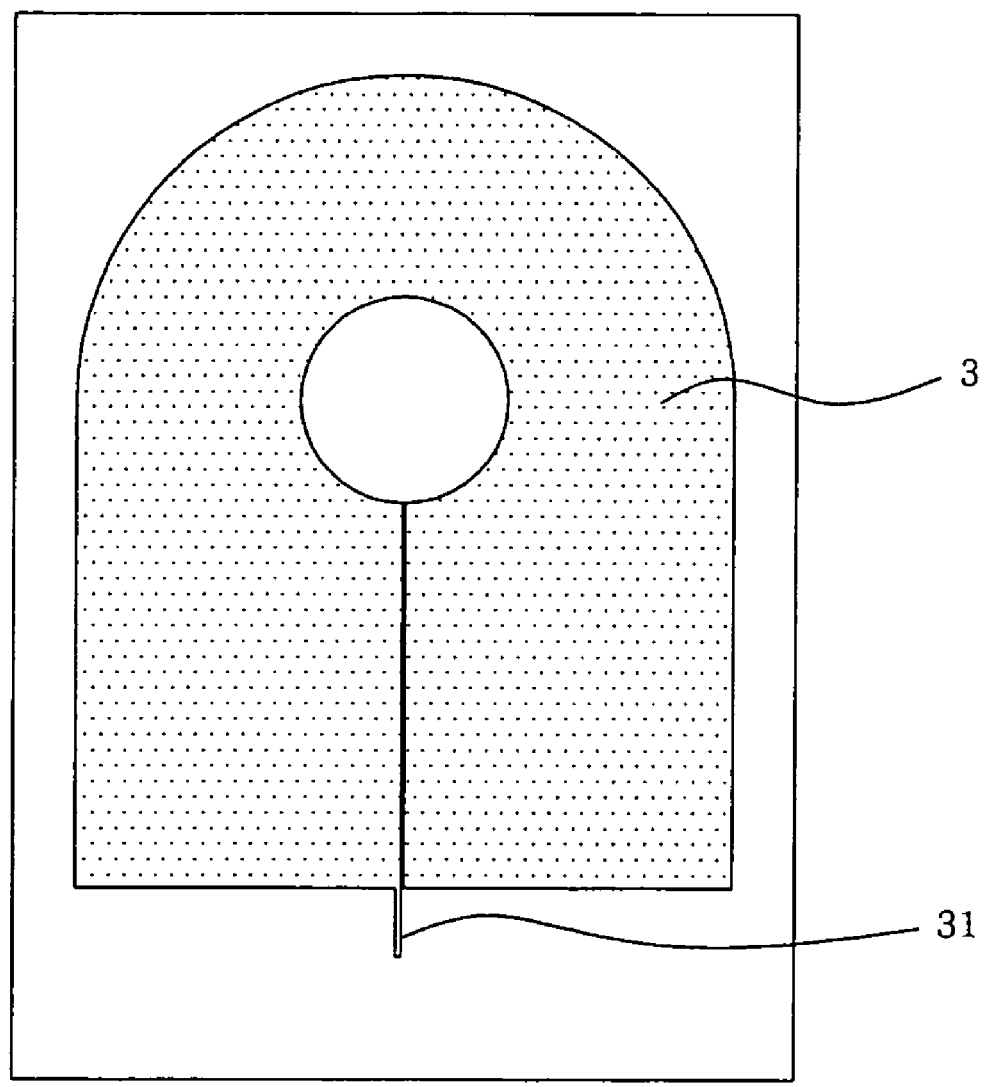
FIG. 3 is a front view of a first guard part shown in FIG. 1.

When the displacement measuring sensor 4 is disposed above the ground part 2, an electric field is formed between the ground part 2 and the displacement measuring sensor 4, and therefore, electric charge is accumulated at the displacement measuring sensor 4. The accumulated electric charge is added to a quantity of electric charge existing between the displacement measuring sensor 4 and the object to be measured, by which measurement errors are caused. In order to overcome this problem, the first guard part 3 is disposed between the displacement measuring sensor 4 and the ground part 2, as shown in FIG. 3, and the same voltage to the displacement measuring sensor 4 is applied to the first guard part 3 such that further generation of electric charge is prevented.

Figure 7:
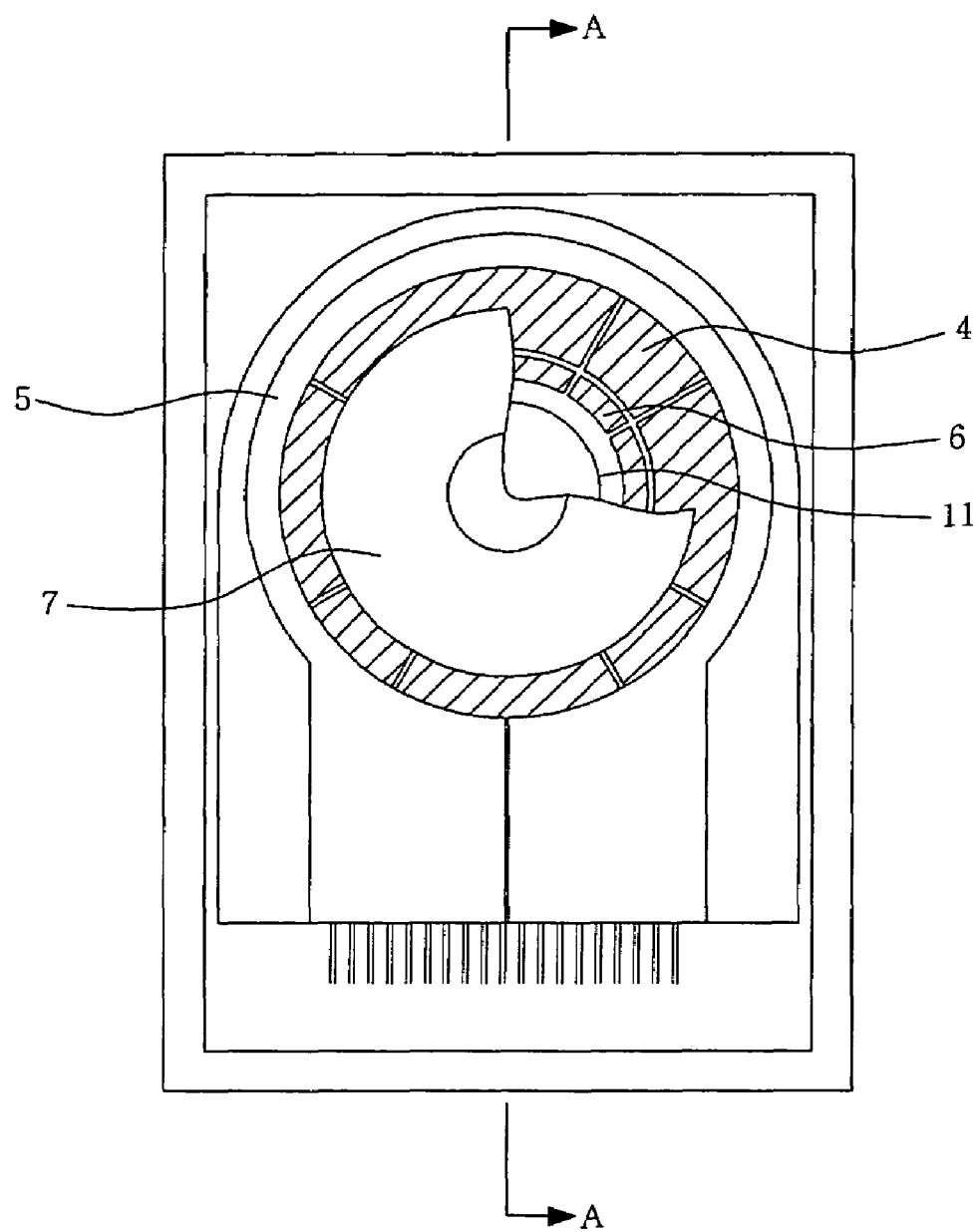
FIG. 7 is a view illustrating the plate type capacitive sensor for five-dimensional displacement measurement according to the present invention attached to an object that is smaller than the sensor.
Figure 8:
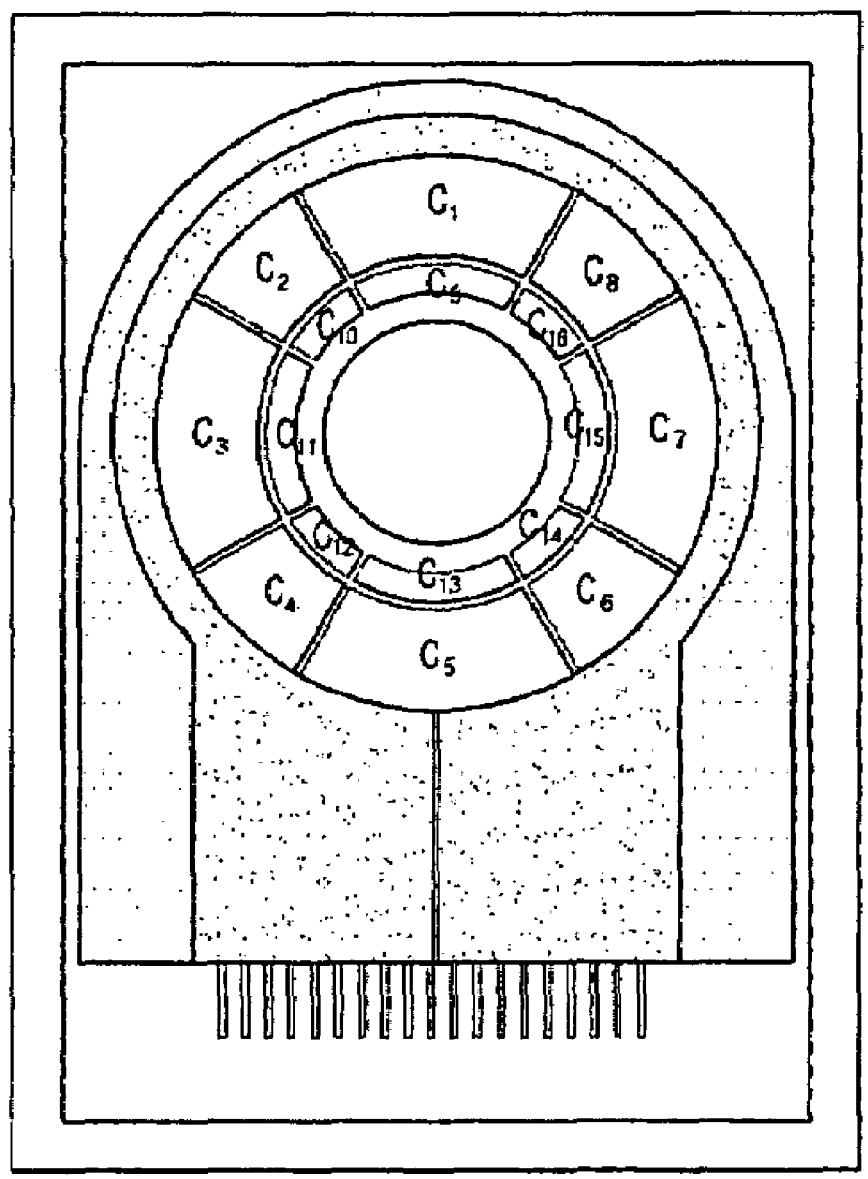
FIG. 8 is a view illustrating the plate type capacitive sensor for five-dimensional displacement measurement, on which capacitances are indicated.
Figure 9:
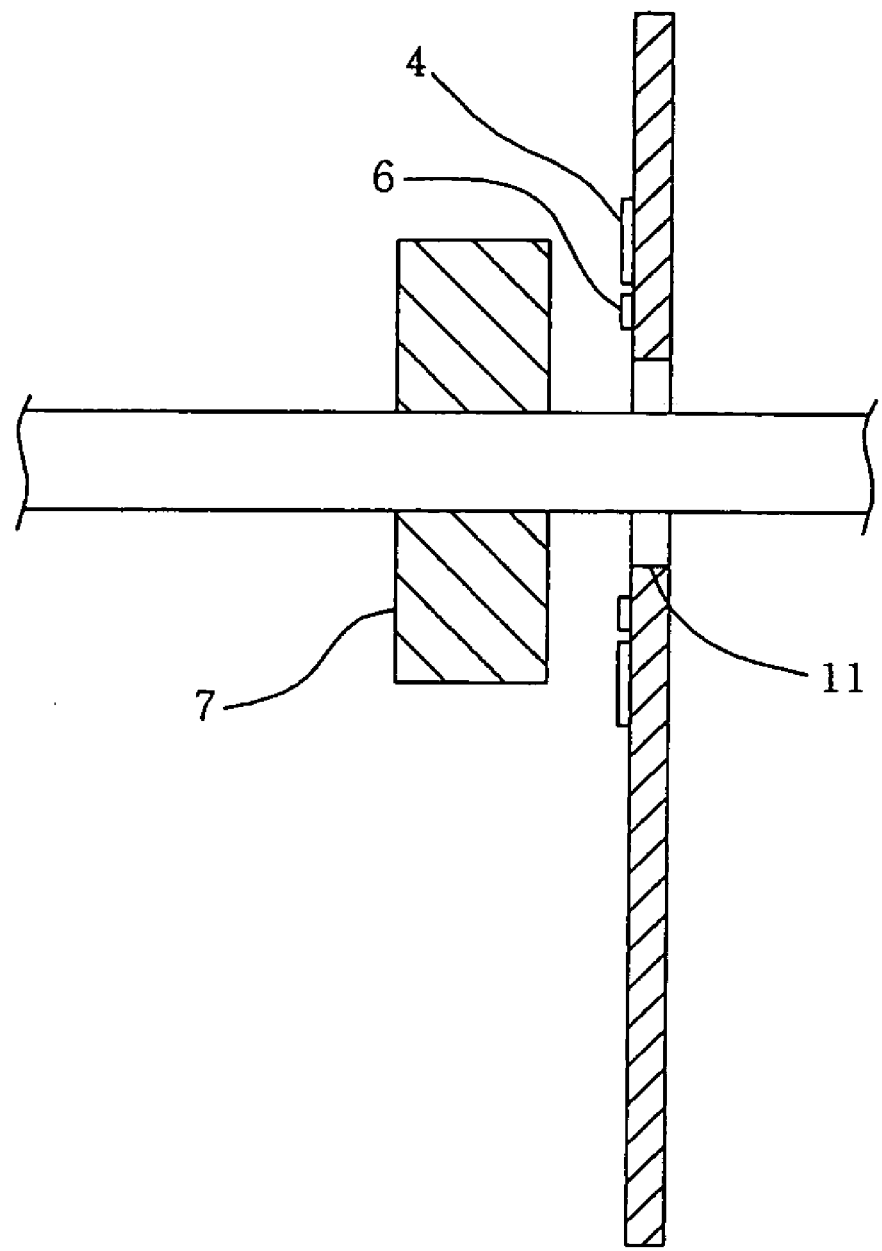
FIG. 9 is a sectional view taken along line A-A of FIG. 7.

FIGS. 7 to 9 illustrate the plate type capacitive sensor for five-dimensional displacement measurement according to the present invention attached to a small-sized object 7. When the object 7 is mounted, a measurement step is formed at a shaft of the object 7 such that the object 7 can be recognized through the hole 11 formed in the plate 1. And then, the measurement surface of the object 7 approaches the sensing surfaces of the displacement measuring sensor 4, or the object 7 is located concentrically with the displacement measuring sensor 7. At this time, on the assumption that the capacitances between the electrode sections of the displacement measuring sensor 4 and the measurement surface of the object 7 are $C_1$ to $C_8$, as shown in FIG. 8, the three-dimensional displacement of the object 7 is expressed by the following the equations through the combined operation of the capacitances.

$$X = \text{Gain}\left(\frac{C_8 + C_7 + C_6 - C_2 - C_3 - C_4}{C_Z}\right)$$

$$Y = \text{Gain}\left(\frac{C_8 + C_1 + C_2 - C_4 - C_5 - C_6}{C_Z}\right)$$

$$Z = \text{Gain}\left(\frac{1}{C_Z}\right), C_Z = C_1 + C_2 + C_3 + C_4 + C_5 + C_6 + C_7 + C_8$$

The measurement surface of the object 7 may tilt to the sensing surfaces of the displacement measuring sensor 4. As a result, the distance between the sensor sections of the displacement measuring sensor 4 and the measurement surface of the object 7 is changed, and therefore, electric charge at the respective sensor sections of the displacement measuring sensor 4 is changed. Consequently, erroneous displacement measurements are generated, when the measurement is performed only by the displacement measuring sensor 4, even though the center of the displacement measuring sensor 4 is aligned with the center of the object 7.

Figure 4:
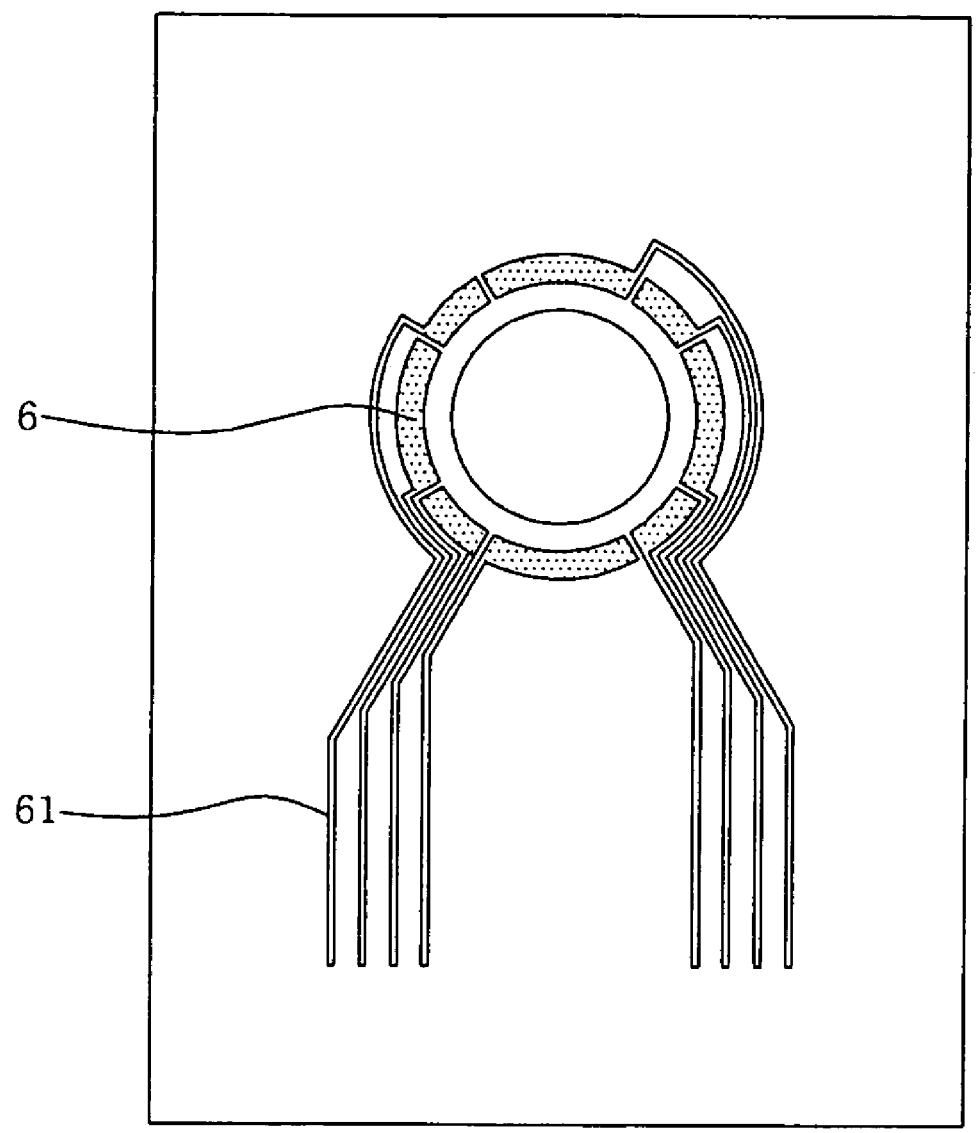
FIG. 4 is a front view of a tilt measuring sensor shown in FIG. 1.

In order to overcome this problem, as shown in FIG. 4, the tilt measuring sensor 6, which is completely covered by the object, is further provided to detect the difference in vertical distance between the object and the displacement measuring sensor 4, i.e., the tilt of the displacement measuring sensor to the object irrespective of the displacement of the object and the displacement measuring sensor. On the assumption that the capacitances between sensor sections of the tilt measuring sensor 6 and the measurement surface of the object 7 are $C_9$ to $C_{16}$, the tilt of the object 7 is expressed by the following the equations through the combined operation of the capacitances.

$$\theta_X = \text{Gain}_\theta\left(\frac{C_{12} + C_{13} + C_{14} - C_{10} - C_9 - C_{16}}{C_{\theta Z}}\right)$$

$$\theta_Y = \text{Gain}_\theta\left(\frac{C_{14} + C_{15} + C_{16} - C_{10} - C_{11} - C_{12}}{C_{\theta Z}}\right)$$

$$C_{\theta Z} = C_9 + C_{10} + C_{11} + C_{12} + C_{13} + C_{14} + C_{15} + C_{16}$$

An appropriate gain A is selected from the measured displacement values based on the detected values, and the displacement measurement errors due to the tilt are removed as expressed by the following equation, whereby the true horizontal displacement ($X_{true}$, $Y_{true}$) of the object is obtained.

$$X_{true} = X - A\theta_Y, Y_{true} = Y + A\theta_X$$

Figure 5:
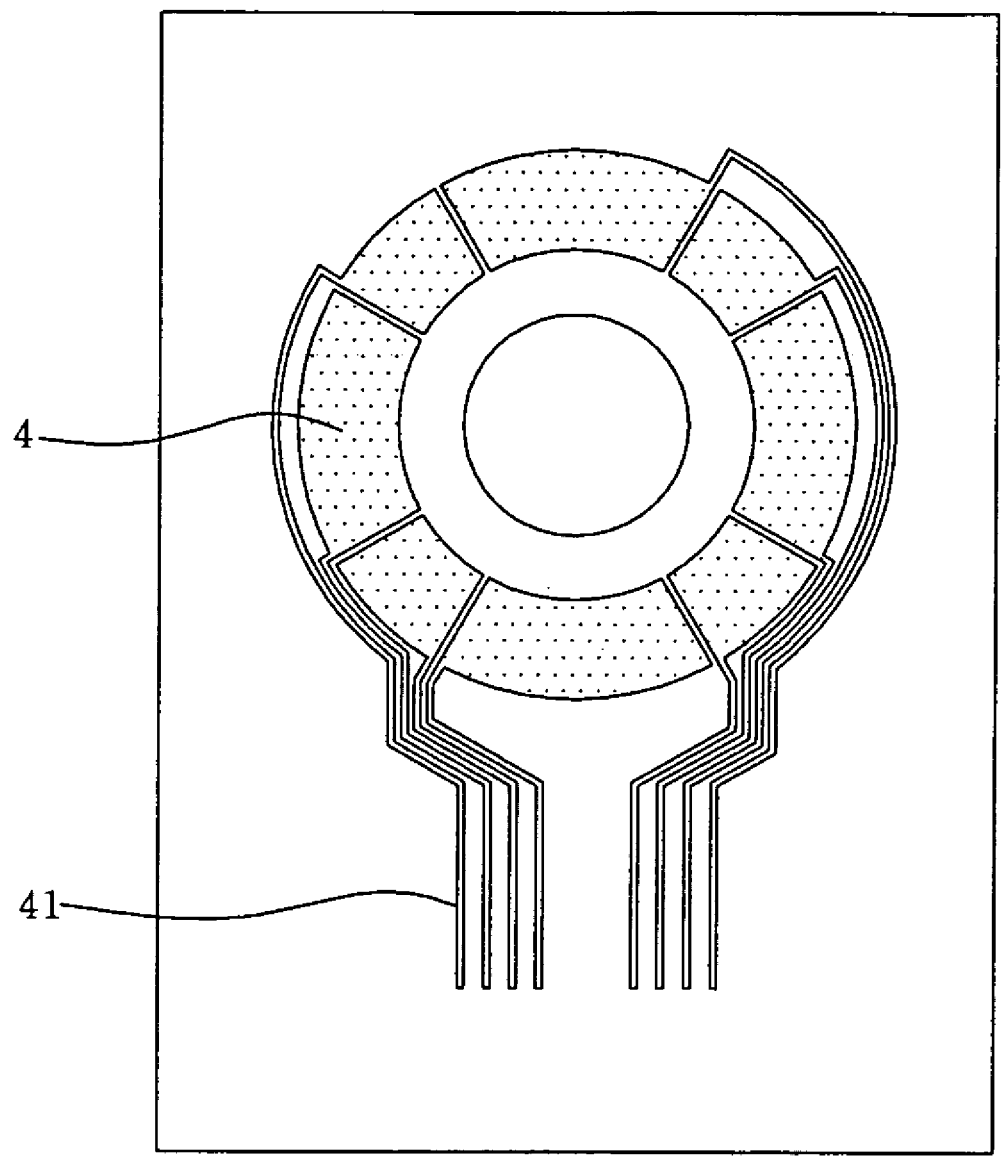
FIG. 5 is a front view of a displacement measuring sensor shown in FIG. 1.

The displacement measuring sensor 4, which serves to measure the displacement of the object, is illustrated in FIG. 5. The sensing surfaces of the displacement measuring sensor 4 are designed, such that the average of the outer and inner diameters of the displacement measuring sensor 4 is similar to the diameter of the object, in order to maximize the measurement range.

Figure 6:
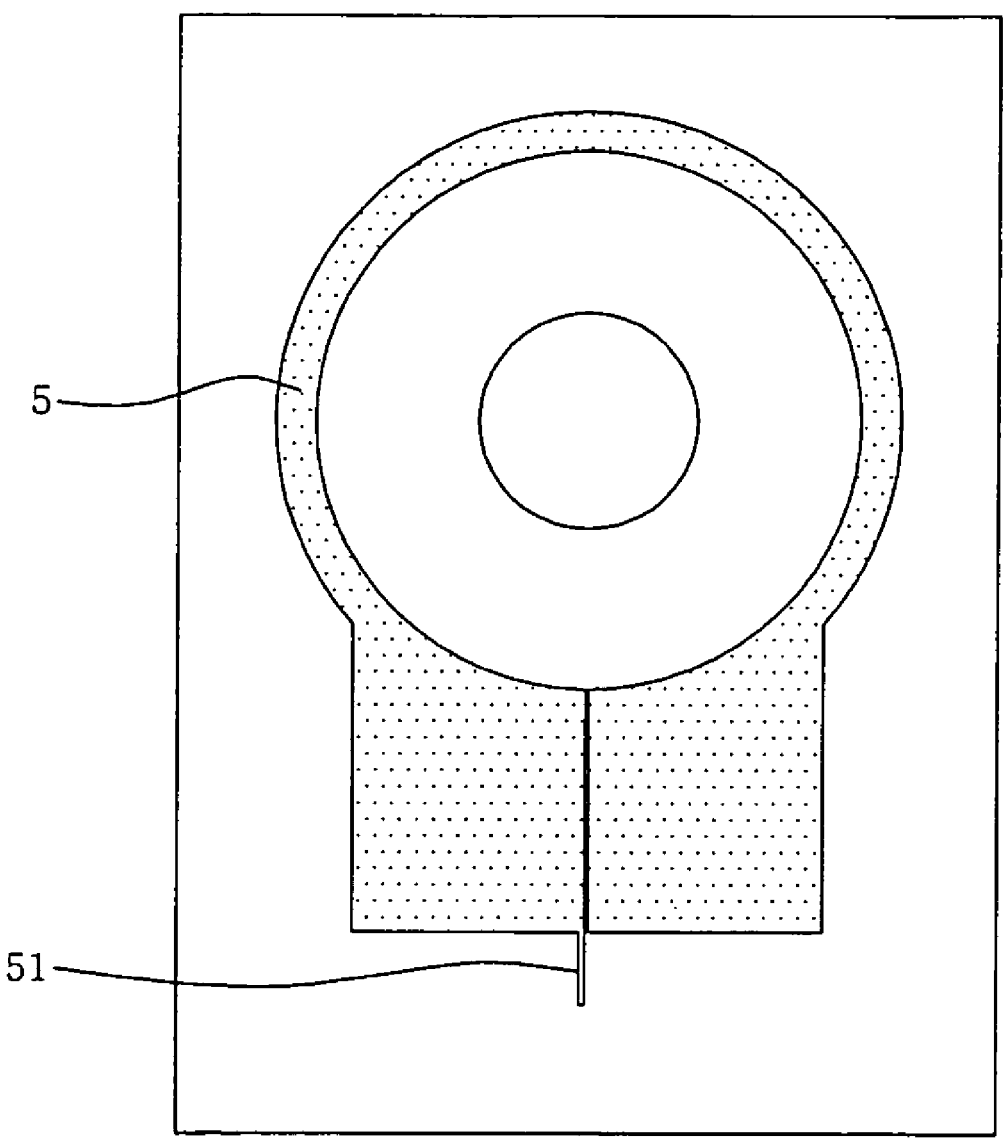
FIG. 6 is a front view of a second guard part shown in FIG. 1.

The second guard part 5, which covers wires 41 of the displacement measuring sensor 4 to prevent stray capacitance that may exist between the wires 41 of the displacement measuring sensor 4 and the object, is illustrated in FIG. 6. The second guard part 5 is disposed above the displacement measuring sensor 4.

A quantity of electric charge generated depending upon the distance between the object and the displacement measuring sensor 4 is measured for each of the sensor sections of the displacement measuring sensor 4, and the measured quantities of electric charge are added to calculate the axial displacement of the object. Also, when the object is displaced in the radial direction, the area common to the object and the sensor sections of the displacement measuring sensor 4 is changed, and therefore, a quantity of electric charge is changed for each of the sensor sections of the displacement measuring sensor 4. The quantities of electric charge measured for the respective sensor sections of the displacement measuring sensor 4 are added, and the added quantities of electric charge are divided by the total quantity of electric charge to eliminate the change in a quantity of electric charge due to the axial displacement of the object. Consequently, the radial displacement of the object is measured.

The method of measuring the displacement of the object based on the measured quantity of electric charge as described above is well known in the technical art to which the present invention pertains, and therefore, a detailed description thereof will not be given.

Figure 10:
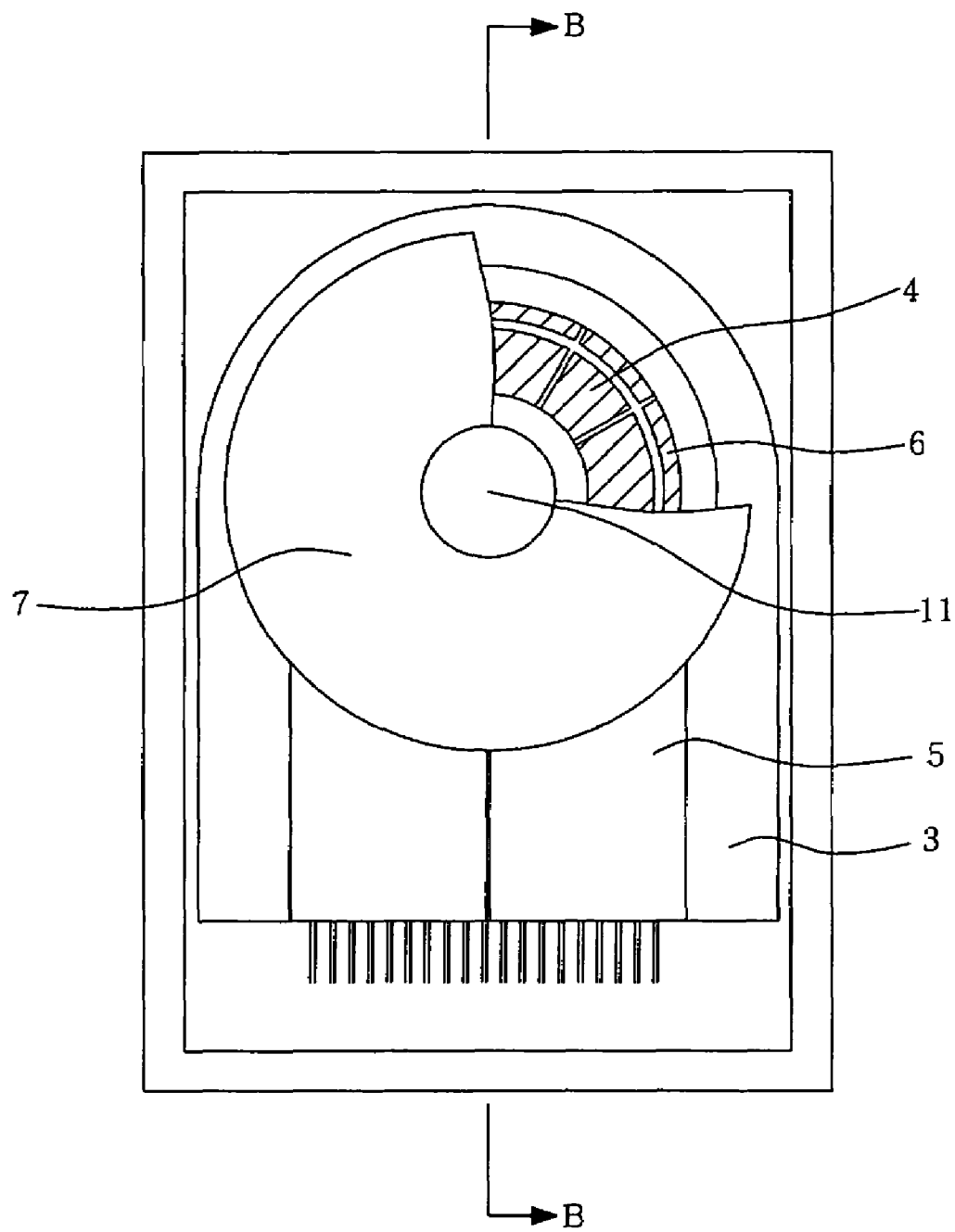
FIG. 10 is a view illustrating the plate type capacitive sensor for five-dimensional displacement measurement according to the present invention attached to an object that is larger than the sensor.
Figure 11:
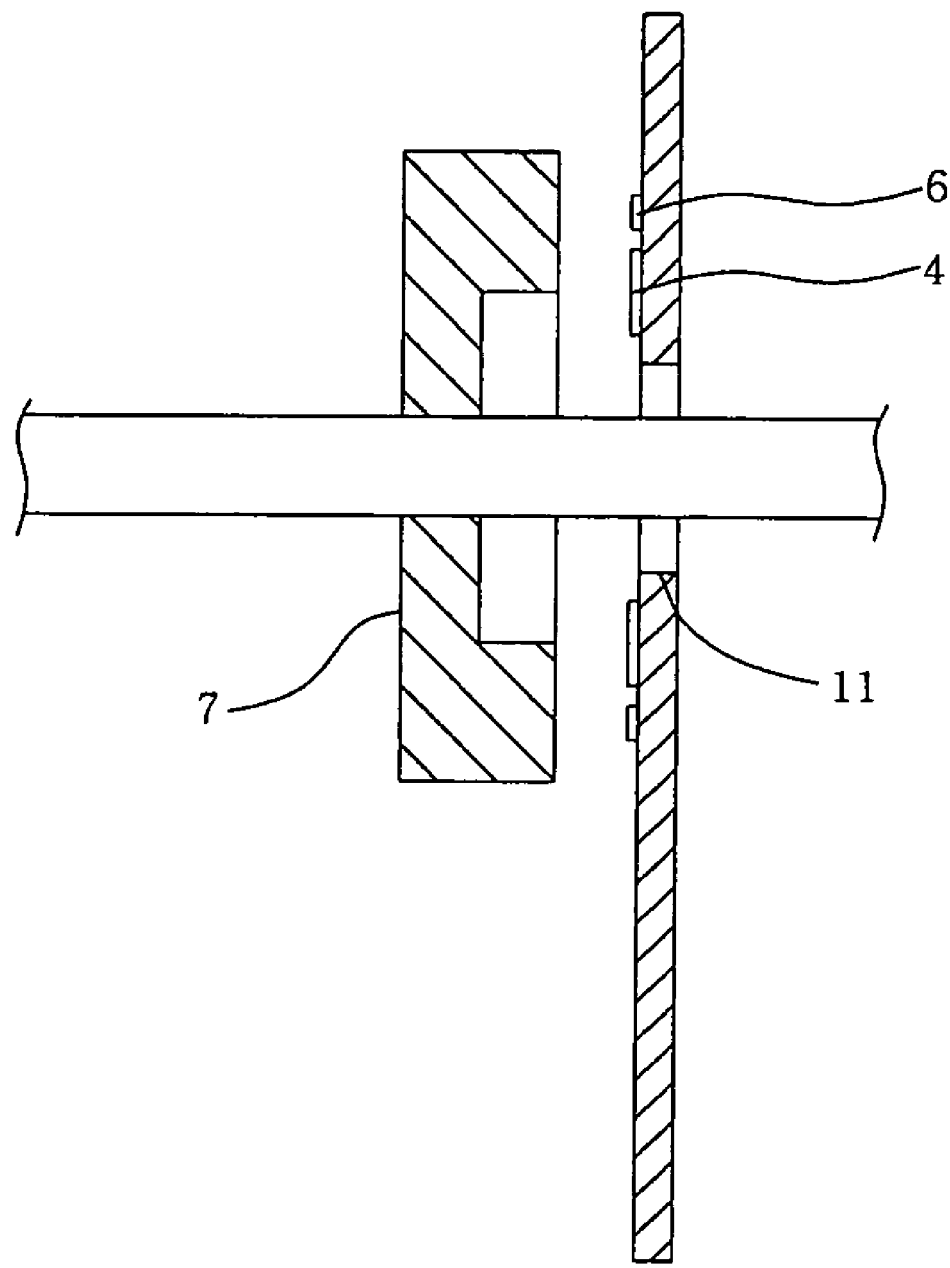
FIG. 11 is a sectional view taken along line B-B of FIG. 10.

When the object 7 is large, and therefore, the diameter of the displacement measuring sensor 4 is placed within the measurement surface of the object 7, as shown in FIGS. 10 and 11, on the other hand, the tilt measuring sensor 6 is disposed outside the displacement measuring sensor 4, and the inner diameter of the measurement surface of the object is placed between the inner and outer diameters of the displacement measuring sensor 4.

The principle and method of measuring the displacement of the object using the displacement measuring sensor and the structure of the plate type capacitive sensor for five-dimensional displacement measurement in the case that the size of the object is larger than that of the displacement measuring sensor are identical to those in the case that the size of the object is smaller than that of the displacement measuring sensor, which has been previously described in detail, and therefore, a detailed description thereof will not be given.

Also, although not shown in the drawings, the displacement measuring sensor and a related measuring circuit may be mounted on a single printed circuit board (PCB). Consequently, no sensor wires are necessary, and it is possible to provide a single sensor system having a sensor and an amplifier incorporated therein.

As apparent from the above description, the present provides an improved plate type capacitive sensor for five-dimensional displacement measurement. Consequently, the present invention has the effect of simultaneously measuring five-dimensional movement of an object, which includes the horizontal movement, the vertical movement, and the tilt of the object, in accuracy.

According to the present invention, the five-dimensional movement of an object, which includes the horizontal movement, the vertical movement, and the tilt of the object, can be measured by the single plate type sensor, and therefore, the sensor mounting part can be disposed without limitation when a rotary system is designed. Consequently, the present invention has the effect of simplifying the rotary system. Also, the length of the rotary shaft can be decreased, and therefore, the natural frequency is increased. Consequently, the present invention has the effect of improving the stability and the dynamic performance of the rotary system.

Furthermore, the sensor can be made using a printed circuit board (PCB), and therefore, the design and manufacture of the sensor is easy. Consequently, the present invention has the effect of reducing the manufacturing costs. In addition, the displacement measuring sensor and the related measuring circuit can be mounted on the PCB. Consequently, the present invention has the effect of removing sensor wires.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A plate type capacitive sensor for five-dimensional displacement measurement, comprising:
    a plate located adjacent to an object to be measured; and
    a ground part, a first guard part, a displacement measuring sensor, and a second guard part, which are stacked on the plate in consecutive order.

2. The sensor as set forth in claim 1, wherein the displacement measuring sensor has eight sensing surfaces, and, as occasion demands, the angles of the sensing surfaces are adjusted such that the sensing surfaces have alternate angles, whereby combined operations are accomplished.

3. The sensor as set forth in claim 1, further comprising:
    a tilt measuring sensor optionally disposed inside or outside the displacement measuring sensor.

4. The sensor as set forth in any one of claim 1, wherein the plate is made of a printed circuit board (PCB).

5. The sensor as set forth in claim 4, wherein the displacement measuring sensor and a related measuring circuit are mounted on the single printed circuit board (PCB).

6. The sensor as set forth in any one of claim 2, wherein the plate is made of a printed circuit board (PCB).

7. The sensor as set forth in any one of claim 3, wherein the plate is made of a printed circuit board (PCB).

* * * * *